US012801995B2

(12) United States Patent
Mitra et al.

(10) Patent No.: US 12,801,995 B2
(45) Date of Patent: Nov. 17, 2026

(54) IN-FIELD RADIO FREQUENCY IMPAIRMENT COMPENSATION

(71) Applicant: Dell Products L.P., Round Rock, TX (US)

(72) Inventors: Jeebak Mitra, Ottawa (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 573 days.

(21) Appl. No.: 18/457,999

(22) Filed: Aug. 29, 2023

(65) Prior Publication Data

US 2025/0077948 A1 Mar. 6, 2025

(51) Int. Cl.
*G06N 20/00* (2019.01)
*G06N 3/045* (2023.01)

(52) U.S. Cl.
CPC ............. *G06N 20/00* (2019.01); *G06N 3/045* (2023.01)

(58) Field of Classification Search
CPC ............................... G06N 20/00; G06N 3/045
See application file for complete search history.

(56) References Cited

U.S. PATENT DOCUMENTS

| | | | |
|---|---|---|---|
| 12,245,052 B2 | 3/2025 | Narasimha Swamy et al. | |
| 12,258,045 B2 * | 3/2025 | Ucar | G06F 18/214 |
| 12,566,249 B2 * | 3/2026 | Srikrishnan | G01S 7/4008 |
| 2018/0101803 A1 * | 4/2018 | Tiwari | G06Q 10/06313 |
| 2019/0218954 A1 * | 7/2019 | Ragaller | F01N 11/00 |
| 2019/0319659 A1 * | 10/2019 | Calabro | G06N 3/08 |
| 2019/0340534 A1 * | 11/2019 | McMahan | G06N 3/098 |
| 2021/0406677 A1 * | 12/2021 | Wang | G06N 3/08 |
| 2022/0343161 A1 * | 10/2022 | Restuccia | G06N 3/09 |
| 2022/0383118 A1 | 12/2022 | Nair et al. | |
| 2023/0036702 A1 * | 2/2023 | Reisser | G06N 3/084 |
| 2023/0180014 A1 | 6/2023 | Storn | |
| 2023/0417870 A1 * | 12/2023 | Srikrishnan | G01S 7/4008 |

(Continued)

OTHER PUBLICATIONS

Pan, S.J .; Yang, Q. "A Survey on Transfer Learning". IEEE Transactions on Knowledge and Data Engineering, vol. 22, No. 10, Oct. 2010, 15 pages.

(Continued)

*Primary Examiner* — Sohana Tanju Khayer
(74) *Attorney, Agent, or Firm* — Amin, Turocy & Watson, LLP

(57) ABSTRACT

A method can comprise training, by a system, a local machine learning model with local radio frequency data. The method can further comprise receiving, by the system, a first global model update from an edge server that is configured to communicate with a group of radio frequency devices, and updating the trained local model based on the first global model update. The method can further comprise receiving, by the system, a second global model update from a central server that is configured to communicate with a group of edge servers that includes the edge server, wherein the second global model update is based on second federated learning of the group of edge servers. The method can further comprise updating the trained local model based on the second global model update. The method can further comprise performing, by the system, self-calibration based on the trained local model to produce a configuration.

20 Claims, 10 Drawing Sheets

(56) References Cited

U.S. PATENT DOCUMENTS

| | | | | |
|---|---|---|---|---|
| 2024/0044961 | A1 | 2/2024 | Juluri et al. | |
| 2024/0111903 | A1* | 4/2024 | Moran | G06N 3/044 |
| 2024/0161012 | A1 | 5/2024 | Pezeshki et al. | |
| 2024/0186106 | A1* | 6/2024 | Wang | H01J 37/244 |
| 2024/0202542 | A1 | 6/2024 | Lindbom et al. | |
| 2024/0305388 | A1* | 9/2024 | Peng | H04B 17/14 |
| 2024/0340660 | A1 | 10/2024 | Balevi et al. | |
| 2024/0346327 | A1* | 10/2024 | Wang | H04W 52/386 |
| 2024/0346376 | A1* | 10/2024 | Liu | G06N 3/098 |
| 2025/0005375 | A1* | 1/2025 | Li | G06N 3/098 |
| 2025/0005443 | A1* | 1/2025 | Mezghani | G06N 20/00 |
| 2025/0168659 | A1* | 5/2025 | Kim | H04W 24/02 |
| 2025/0293943 | A1* | 9/2025 | Kela | H04L 41/16 |

OTHER PUBLICATIONS

Zhuang, F.; Qi, Z.; Duan, K.; Xi, D.; Zhu, Y.; Zhu, H.; Xiong, H.; He, Q. "A comprehensive survey on transfer learning". arXiv preprint [https://arxiv.org/pdf/1911.02685], 2020, 31 pages.

Kaichao You, Yong Liu, Mingsheng Long, and Jianmin Wang. "LogME: Practical Assessment of Pre-trained Models for Transfer Learning". arXiv preprint [https://arxiv.org/pdf/2102.11005], 2021, 13 pages.

X. Hu et al., "Convolutional Neural Network for Behavioral Modeling and Predistortion of Wideband Power Amplifiers," IEEE Trans. Neural Netw. Learn. Syst., vol. 33, No. 8, pp. 3923-3937, Aug. 2022, 15 pages.

L. J. Wong, W. H. Clark IV, B. Flowers, R. M. Buehrer, A. J. Michaels, and W. C. Headley, "The RFML Ecosystem: A Look at the Unique Challenges of Applying Deep Learning to Radio Frequency Applications." arXiv preprint [https://arxiv.org/pdf/2010.00432], 2020, 19 pages.

Mitra et al. "Using Prior Knowledge to Calibrate a Radio Frequency Frontend" U.S. Appl. No. 18/364,440, filed Aug. 2, 2023, 46 pages.

Office Action mailed Nov. 5, 2025 for U.S. Appl. No. 18/364,440, 43 pages.

Notice of Allowance mailed Mar. 13, 2026 for U.S. Appl. No. 18/364,440, 44 pages.

* cited by examiner

IN-FIELD RADIO FREQUENCY IMPAIRMENT COMPENSATION

RELATED APPLICATIONS

The subject patent application is related by subject matter to, U.S. patent application Ser. No. 18/364,440, filed Aug. 2, 2023 and entitled "USING PRIOR KNOWLEDGE TO CALIBRATE A RADIO FREQUENCY FRONTEND," the entirety of which application is hereby incorporated by reference herein.

BACKGROUND

A base station can communicate with user equipment to facilitate mobile communications, or cellular network communications. In doing so, a radio frequency (RF) frontend of a base station can be calibrated to improve performance.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example method can comprise receiving, by a system, a global machine learning model. The method can further comprise training, by the system, the global machine learning model with local radio frequency data to produce a trained local machine learning model, wherein the trained local machine learning model is trained to provide self-calibration information for calibration and impairment compensation of the system in at least one of transmitting or receiving radio frequency data. The method can further comprise receiving, by the system, a first global model update from an edge server that is configured to communicate with a group of radio frequency device. The method can further comprise updating, by the system, the trained local machine learning model based on the first global model update to produce a first updated local machine learning model. The method can further comprise receiving, by the system, a second global model update from a central server that is configured to communicate with a group of edge servers that includes the edge server, wherein the second global model update is based on second federated learning of the group of edge servers. The method can further comprise updating the first updated local machine learning model based on the second global model update to produce a second updated machine learning local model. The method can further comprise performing, by the system, self-calibration and impairment compensation based on the second updated local model to produce a compensated signal using the updated local machine learning model. The method can further comprise at least one of transmitting or receiving, by the system, the radio frequency data based on the configuration.

An example system can operate as follows. The system can update a trained local model to produce an updated local model, wherein the trained local model was generated as a result of training a local machine learning model with local radio frequency data or measurements, wherein the trained local model is configured to provide self-calibration information for calibration of the system, and wherein the updating is based on: receiving a first global model update from an edge server that is configured to communicate with a group of radio frequency devices that perform first federated learning for the first global model update, and receiving a second global model update from a central server that is configured to communicate with a group of edge servers that includes the edge server, wherein the group of edge servers perform second federated learning for the second global model update. The system can perform self-calibration based on the updated local model.

An example non-transitory computer-readable medium can comprise instructions that, in response to execution, cause a system comprising a processor to perform operations. These operations can comprise training a local model, wherein the local model is configured to generate radio frequency calibration information. These operations can further comprise updating the local model to produce an updated local model, the updating being based on: receiving a first global model update from a first computer that is configured to communicate with a group of radio frequency devices that perform first federated learning for the first global model update, and receiving a second global model update from a second computer that is configured to communicate with a group of first computers that includes the first computer, wherein the group of first computers perform second federated learning for the second global model update. These operations can further comprise performing self-calibration based on the updated local model.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
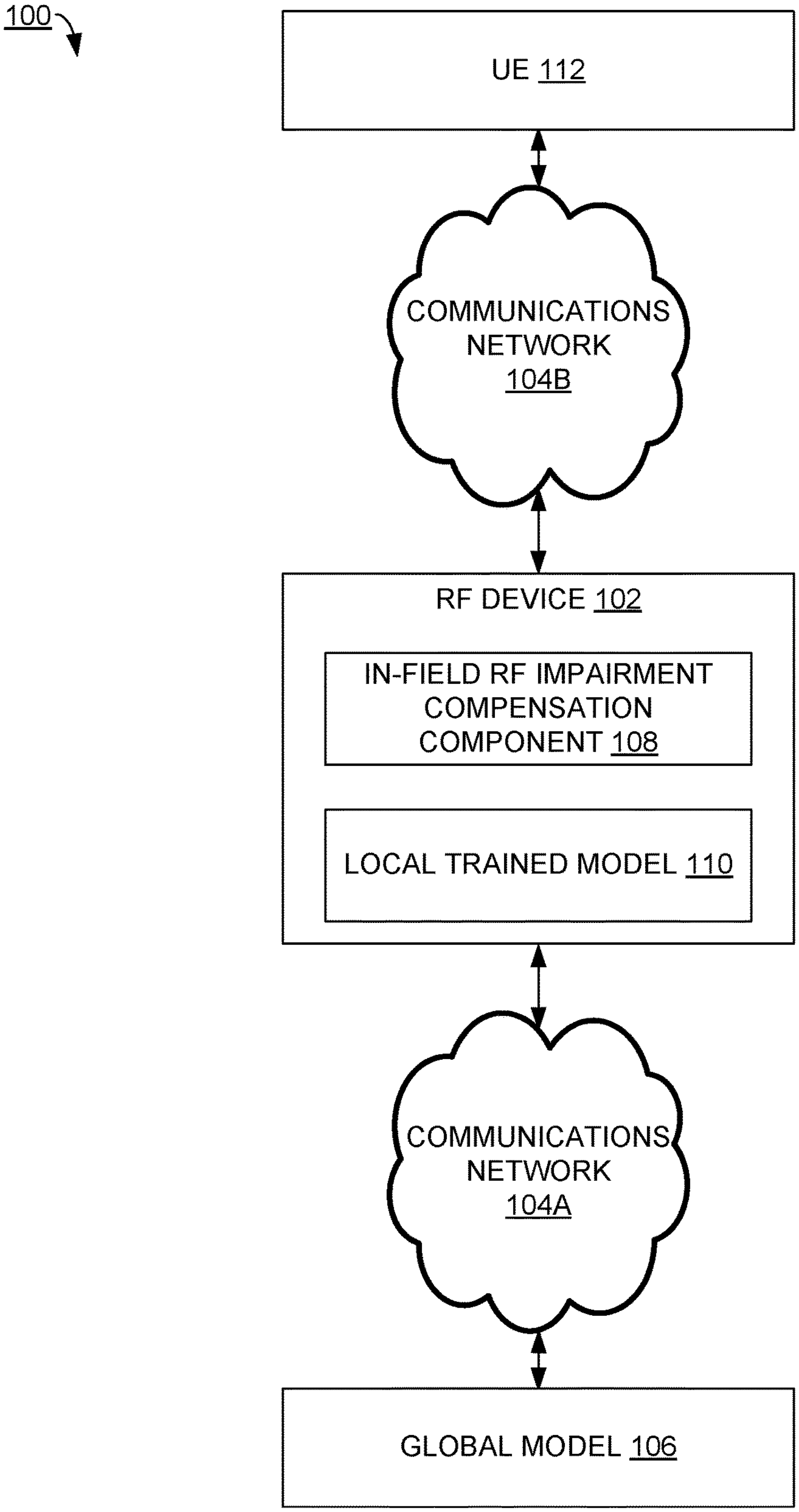
FIG. 1 illustrates an example system architecture that can facilitate in-field RF impairment compensation, in accordance with an embodiment of this disclosure.

Application of AI/ML techniques to wireless communications has gained popularity due to an ability of such techniques to model and learn various statistical distributions describing both the wireless signal, which may not have a closed form mathematical representation for real world channels, and behavior of various hardware blocks, which might even be non-linear. However, while there has been varied levels of success in applying these techniques to network performance optimization and baseband signal processing, application of these techniques for RF modules has been relatively limited. Nonetheless, self-calibration for RF devices can be important in achieving a goal of autonomous networking, and thus reduce capital expenditures (CAPEX) and operating expenditures (OPEX) for wireless networks. While factory calibration of such RF modules when the device is powered on can have some level of automation, it can be that in-field optimization is either non-existent or requires manual intervention for appropriate fine-tuning. In-field optimization can become necessary for the continued optimal operation of a RF device as per changing channel and device conditions that have varying time scales. An increasingly important way of enabling self-calibration features in RF devices can involve employing AI/ML techniques. The present techniques involve frameworks and methods that enable self-calibration and impairment compensation features in RF devices that employ AI/ML techniques for field-deployed radios.

In recent years, there has been increasing interest in the application of ML techniques-especially deep learning (DL)—to wireless communications. With initial successes in these areas, AI/ML techniques can now be considered to be a core transformative technology in the implementation of the fifth generation (5G) new radio (NR) standard, and can be expected to be a fundamental basis for beyond 5G (B5G) and 6G networks. Prior approaches in this area generally use supervised learning techniques—that is, training based on labeled data whereby the models are initialized using a random set of weights, and progressively updated through closed loop feedback using the labeled data. While the results from such approaches can be impressive, a problem can relate to an inherent assumption in such applications of an availability of large amounts of labeled training data from environments that are representative of expected operational real-world environments for model deployment. For wireless communication, these real-world environments can be the RF environments in which the radio units will work once deployed in-field to carry live traffic. These real-world environments can also include various RF hardware variations that occur either due manufacturing process variance, or various channel effects, as well. However, often the assumption regarding availability of data from close-to-true operational environments does not hold true due to huge variability of wireless operational environments. This can imply that can be extremely challenging, if not impossible, to have data that can account for all scenario that the radios can operate in, and the trained model can be used in heretofore unseen environments, which can pose a risk of degraded performance. In fact, prior approaches in the area (based on forms of offline supervised learning) have shown a limited ability to generalize to new hardware effects and channel conditions as performance can be seen to degrade rapidly under deviations. Customizing and innovating deep learning architectures and techniques for application in the RF domain using domain specific knowledge, therefore, can continue to be a challenge. One of the reasons for this can be that several of the techniques used in prior approaches have been developed in domains such as image processing, computer vision (CV) and natural language processing (NLP), where access to large, labeled data sets is less of an issue. Additionally, prior approaches that relate to an application of AI/ML techniques to the RF domain has been generally restricted to areas such as cognitive radio (sensing), automatic modulation classification, and the like. While these can be important applications in their own right, the scope of application of AI/ML techniques can be extended to more fundamental operations in the RF domain, such as signal pre-conditioning in both the transmit and receive chains. Furthermore, for truly unleashing the value of these new approaches that can tend to be agnostic to true statistical distributions of the signal, approaches that allow their application to real-world deployments in a seamless fashion can be needed. This can be important to establish an economic benefit from the significant efforts and advances made in this area.

It can be that application of AI/ML techniques to RF processing has been scant due to several issues related to the operating environment—e.g., non-stationary and highly frequency selective channels along with pressure, voltage, temperature (PVT) variation in devices, and fast times-scales in which RF operations occur. When designing for real-world deployment on several thousands of devices, an AI/ML model developed offline from one set of transceiver measurements can be sub-optimal for both a majority of the rest of RF front-end boards due to process variations commonly seen in volume production; and even the trained radios over a course of time as the RF environment evolves. Self-calibration using ML techniques can therefore be considerably challenging for RF volume production, and can yield significant dividends if solved effectively,—that is, in a computationally-cheap manner.

For base station (BS) functionality to maintain optimal levels, high quality RF components and design can be considered imperative so that the transmission losses can be minimized. Furthermore, industry alliances such as Open-Radio Access Network (O-RAN), can advocate for disaggregated networks to provide an opportunity to use BS elements implementing various functionalities of the protocol stack, such as radio units (RU), distributed units (DU) and centralized units (CU), from different vendors, and potentially mix-and-match units from any vendor as long as the units meet inter-operability specifications.

However, for a vendor-neutral O-RAN adoption to be competitive performance wise, quality of transmission can need to be maintained in all cases. Recently, well-trained AI/ML models have been shown to have an ability to compensate for a multitude of RF frontend non-idealities. Additionally, RF components can be liable to degrade over time due to several factors such as overuse, inadequate maintenance, aging, environmental factors, etc. A critical part of maintenance, and thus ensuring optimal performance, can be identifying a source of observed distortion so that degradation from such distortion can be adequately corrected by:

Operating the RF component in a more efficient mode; or

Proactively replacing the RF part to avoid traffic disruptions.

ML techniques can be used to address these issues, as well, by considering requisite parameter updates for the specific devices. Typically, these scenarios, however, develop a model offline considering only one or two transceiver devices that can represent a marginal representation of the RF environment where the AI/ML models will operate. Therefore, a technique to easily adapt AI/ML models and make them work universally on RF front ends developed for the same application can continue to be an objective.

Conventional ML approaches can be implicitly trained for a specific scenario, and the real-world application can be expected to be some small variation of this with added noise. Wireless environments, however, can be subject to variations that can make the new scenarios differ significantly from the previous ones due to several reasons, such as:

changes in the radio propagation channel itself;

RF front end behavioral variation;

changes in users' traffic demands, etc.

Additionally, performance of AI/ML techniques can rely on an availability of sufficient training data, but acquiring enough data can be costly and time-consuming. In fact, deep learning (DL) techniques, can usually require a long training time, which can make them impractical for many latency-sensitive applications.

A problem with applying AI/ML techniques to wireless communications can relate to computational burden. Many wireless devices can be constrained by their limited computing capacity, and thus, are unable to train high-complexity ML models, especially when they are already operational. Furthermore, in environments where distributed learning is inherent, training and initialization of ML models can pose a significant challenge, as it can be that the computing platform is not be able to localize the training of the models without increasing complexity significantly. However, while there may be many nodes implementing the model, the dynamics (statistics) of the underlying process that the model is trying to learn can tend to be the same or similar. These kind of application scenarios can be amenable to using techniques that are captured under the domain of federated learning.

As described below, a use of various radio units with their own individual RF front-ends, many of which may be connected to the same DU, or controlled by the same CU further up the chain, can provide an opportunity to use techniques from the domains of federated learning to enhance overall performance and training times for the relevant AI/ML models with minimized communication costs.

A problem with applying AI/ML techniques to wireless communications can relate to centralized processing. Centralized ML systems can be able to use powerful servers for processing and training, however when working with a distributed deployment where the data is gathered at telemetry end points that are far away, it can be that there is a requirement to transfer huge amounts of data from the telemetry points to the servers over links with limited bandwidth. In addition to communication overhead, there can be a risk that model update can have a high latency that is unacceptable for the intended application. Consequently, this can significantly impact the overall performance with the updated ML models and hinder their applicability. A cloud-centric approach can therefore incur unacceptable latency for applications as it can often involve long propagation delays.

The present techniques can mitigate these problems.

The present techniques can be implemented to facilitate effective ML based mitigation for RF impairment for equipment that is deployed in-field without requiring significant amounts of data transfer from the RF devices to a central server for a cloud-RAN, or expensive RF boards where significant computational power can be needed on-board itself to support a fully-local update of a ML inference engine. The present techniques can be implemented to facilitate a hybrid approach that applies computationally simple statistical filtering and feature engineering techniques on board, and then uses such statistically significant metrics for a global model update that take advantage of collaborative filtering to maintain a resilient model that does not overfit to data collected at relatively few devices.

Some examples of applying AI/ML techniques for RF calibration can involve using random initialization followed by supervised learning techniques, which can be representative of anticipated observations once deployed. Such operational environment considerations can include both on-board RF hardware variations and channel effects. However, due to a lack of data sets that can cover a myriad of conditions that the RF equipment can operate in, the model can be unable to capture several field conditions during the training process. When an assumption used to train the model does not hold, prior techniques have shown a limited ability to generalize, for example, to new hardware effects and channel conditions. In such cases, some way of online learning through techniques such as reinforcement learning can prove to be valuable. However, such online learning can often require significant processing power in a field-deployed unit such as a RU, and it can be that this is seldom available.

Figure 2:
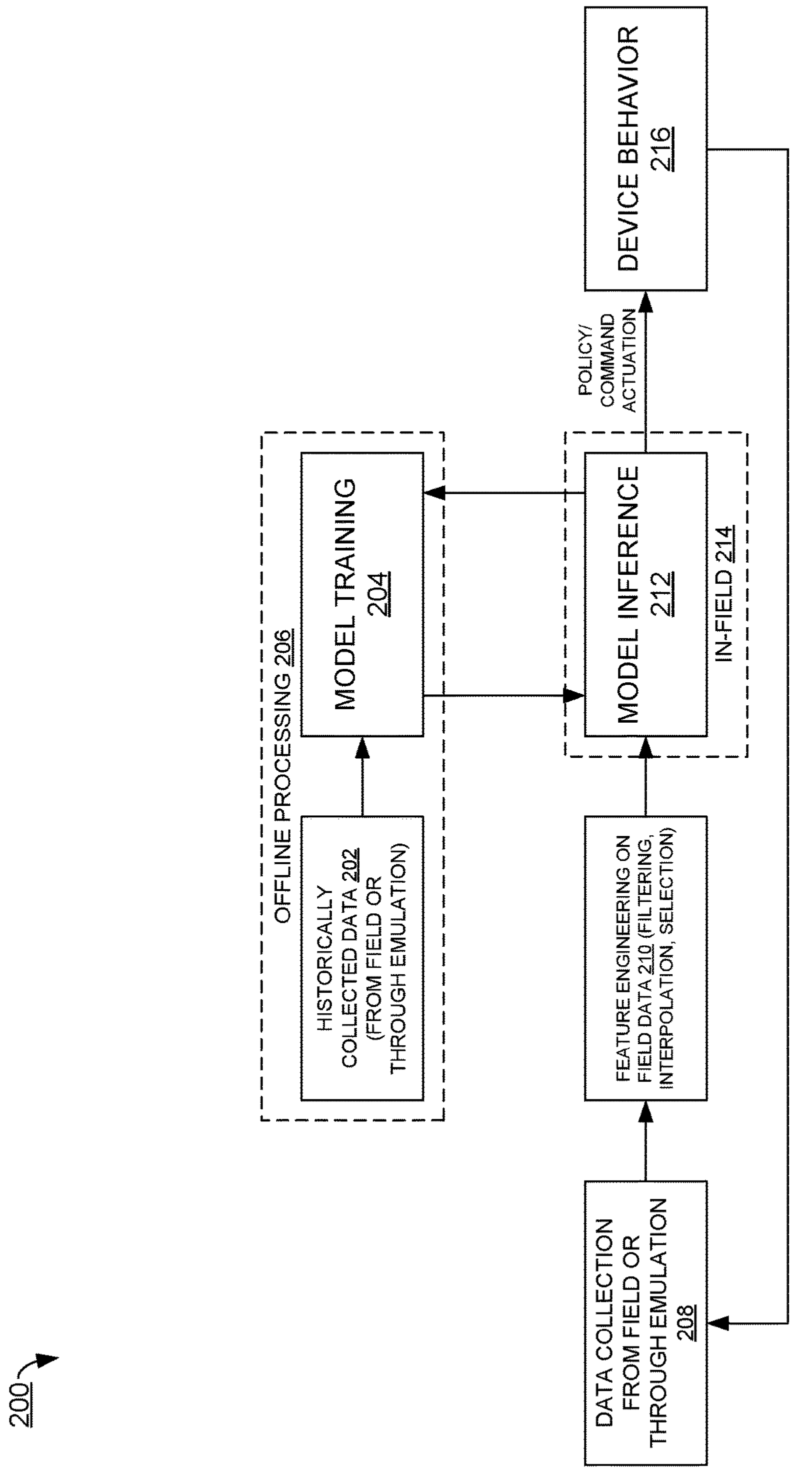
FIG. 2 depicts a general learning framework for combining offline and online learning, and that can facilitate in-field RF impairment compensation, in accordance with an embodiment of this disclosure.

The present techniques provide a framework for efficient online learning (in the case of RF equipment, this can be referred to as in-field learning) that can leverage a combination of distributed and centralized learning for in-field model updates. FIG. 2 depicts a general framework that can be followed to integrate (1) a ML based model deployment approach that is able to leverage an available measurement data for offline model build; and then (2) when this model is deployed in-field, an inference engine can further be updated through the measurements captured while the device under test (DUT) is carrying live traffic. Typically, the inference engine updates can be performed in a manner that is relatively computationally cheaper than the offline training.

According to the present techniques, each RU can perform local learning. It can be that the RUs generally have the same characteristics and capabilities in the sense that a high-level design for each of them is the same. However, there can be variations in the RUs in practice and/or performance due to a manufacturing process variation in analog equipment (as it can be that no two devices have identical transfer characteristics), as well as due to environmental/operational conditions in-field that can be markedly different based on use and other conditions.

While certain characteristics and their data-driven optimization can be local to a RU, a global model can, for example, help identify longer term aspects, such as what power amplifier (PA) bias level is optimal for what level of traffic. In this example, pre-distortion coefficients that are used for a certain PA bias level can still be determined locally (based on data collected by that RU). However, since determining that optimal bias level can be a function of (i) a target power level, (ii) an amount of corresponding energy consumption, and (iii) a traffic level experienced, it can involve multiple decision loops to work in tandem, which can be an optimization better carried out by an edge or central server with better compute capability, relative to a RU.

Considering an overall data-driven RF optimization framework, it can be that some aspects are more amenable to local (in-device) optimization than others, where some aspects can better benefit from data aggregation, and deriving intelligence from the data aggregation at a higher level where more data points can be collected from an architectural standpoint. To facilitate this, data can be sent from an RU to a central server in an anonymized fashion so as to maintain a level of security and/or privacy that is afforded by federated learning (FL). FL can generally comprise a machine learning approach that trains a model via multiple separate and independent sessions that each use their own dataset. This can be viewed in contrast to a centralized machine learning approach where multiple local datasets are combined in one training session, as well as approaches where the local data samples are identically distributed.

In a RU scenario, FL can provide security and/or privacy where different RUs belong to different operators. The present techniques can be implemented to update (or inform) parts of a local model at a RU based on a global model, while updating different parts of the local model based on local training.

The present techniques can be implemented to reduce a cost of collecting data, as well as training AI/ML models for application to RF optimization, such as transmit output power, energy efficiency, skew, frequency offset (FO) mitigation, etc. In-field optimization of the parameters of an inference engine can be facilitated, and a global model can be updated for macro level (long time-scale) optimization of a group of distributed RUs that can be connected to a single higher layer device (e.g., DU/CU or RIC), which can serve a purpose of a centralized macro learning unit with greater compute capability and collected data to yield performance gains. In some examples, these in-field optimizations can be performed through a quantized neural network architecture that use L-bit representations for data and Q-bit representations for weight where $1<N, M<<32$.

Example Architectures and Frameworks

FIG. 1 illustrates an example system architecture 100 that can facilitate in-field RF impairment compensation in base stations in accordance with an embodiment of this disclosure.

System architecture 100 comprises RF device 102 (which can be a part of a base station), communications network 104A, communications network 104B, global model 106, and user equipment (UE) 112. In turn, RF device 102 comprises in-field RF impairment compensation component 108, and local trained model 110.

Communications network 104A can comprise backhaul infrastructure used for transferring data. Communications network 104B can comprise infrastructure used for transferring data. RF device 102 can generally comprise circuitry of a radio disposed between a radio's antenna and its baseband. UE 112 can comprise a wireless communications device that can be used by an end user to communicate with RF device 102.

As part of calibrating a frontend, RF device 102 can use prior knowledge, which may include measurements that are done to characterize and input-output relationship of the RF front-end circuitry to calibrate in-field RF impairment compensation component 108, and train local trained model 100 locally, i.e., using data pertaining to that RF board only. After in-field RF impairment compensation component 108 trains local trained model 100, an update can be sent to global model 106. In some examples, this update can comprise transferring connections between neurons and weighs for those connections, without transferring a core model of a number of layers having a number of neurons.

Global model 106 can be updated based on this update to the local model, and this update can be sent to multiple other source RF frontends that have their own local models, and those other source RF frontends can update their local model based on the global model.

Figure 7:
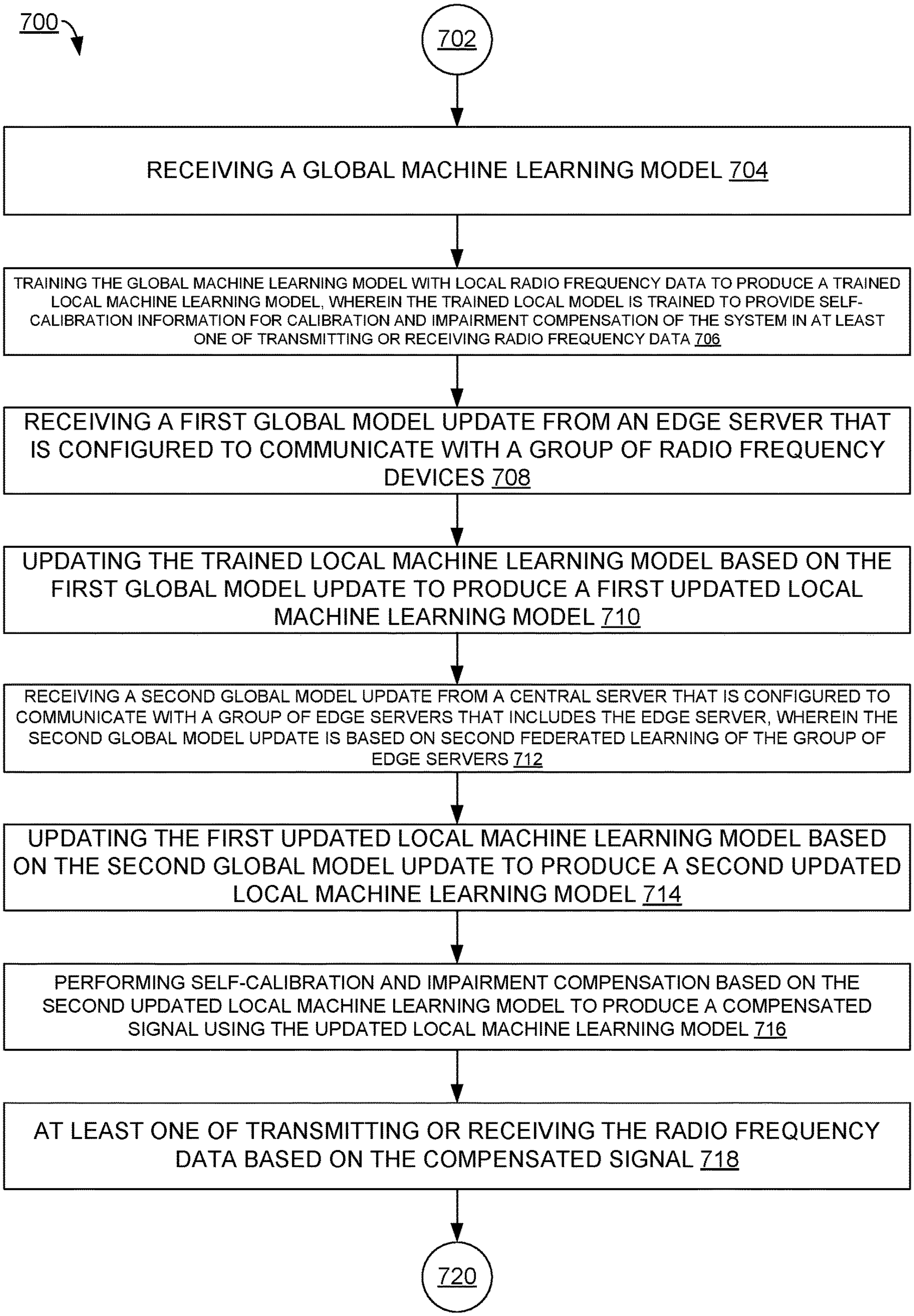
FIG. 7 illustrates an example process flow that can facilitate in-field RF impairment compensation, in accordance with an embodiment of this disclosure.
Figure 8:
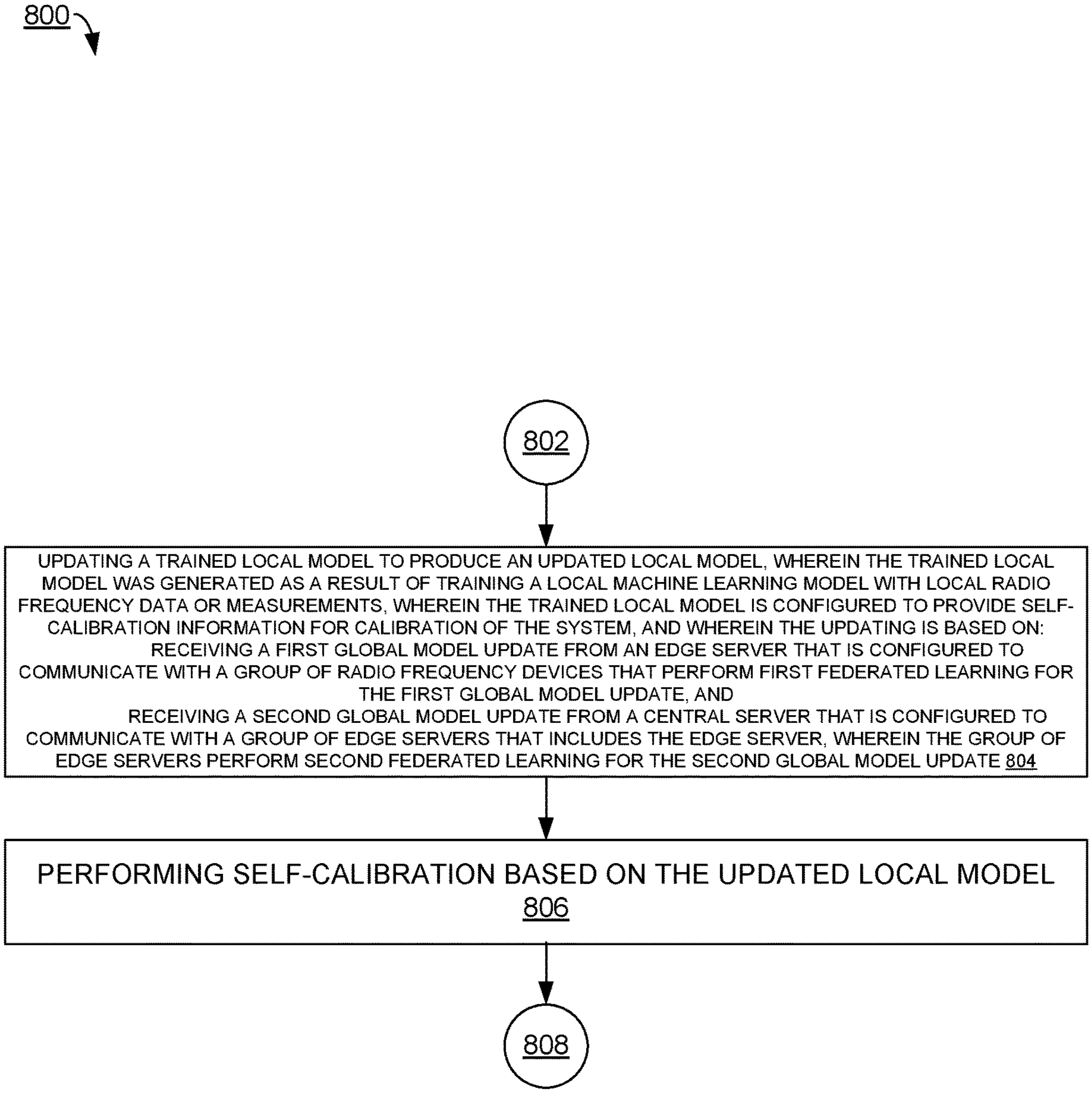
FIG. 8 illustrates another example process flow that can facilitate in-field RF impairment compensation, in accordance with an embodiment of this disclosure.
Figure 9:
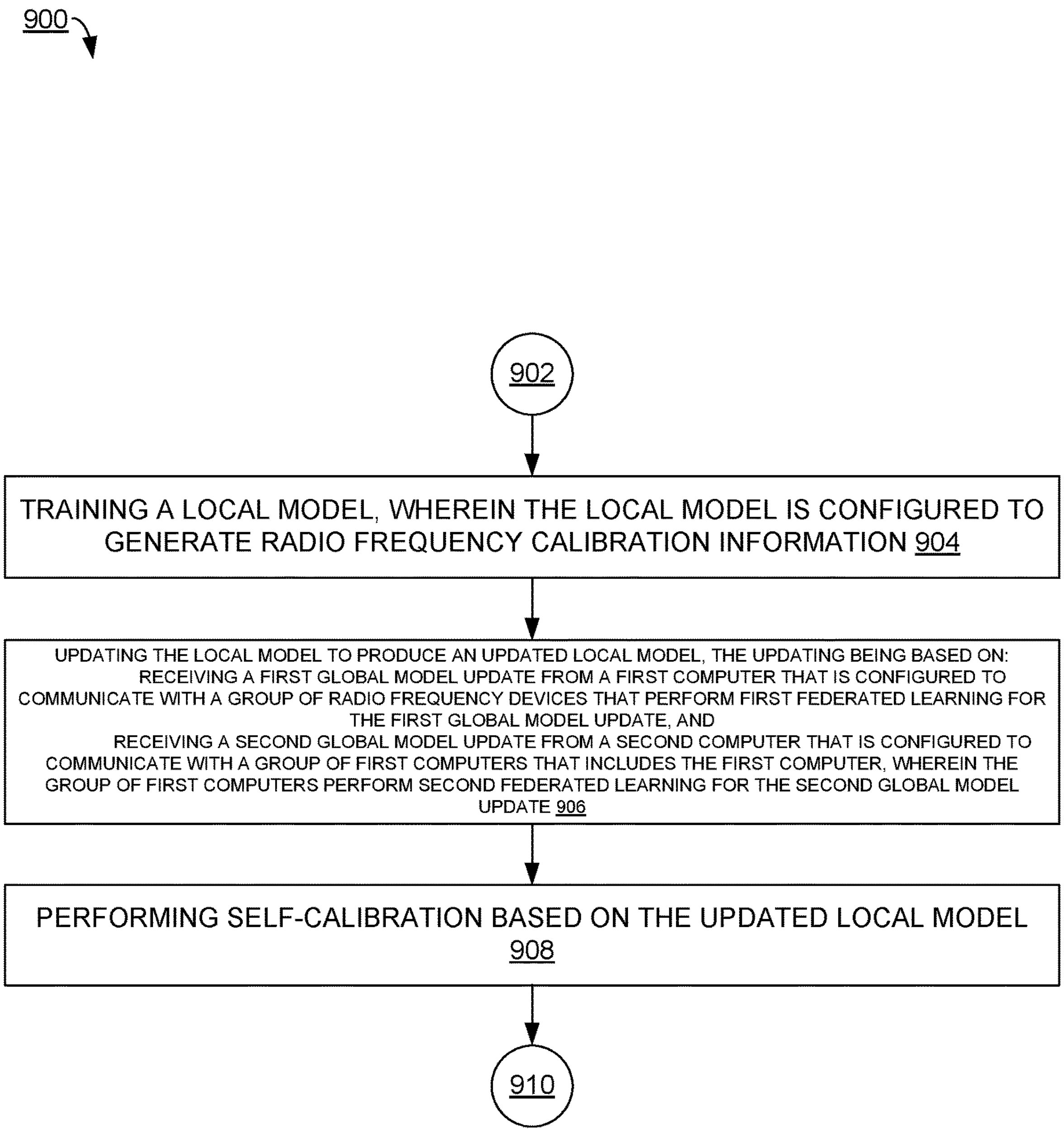
FIG. 9 illustrates another example process flow that can facilitate in-field RF impairment compensation, in accordance with an embodiment of this disclosure.

In some examples, in-field RF impairment compensation component 108 can implement part(s) of the process flows of FIGS. 7-9 to implement in-field RF impairment compensation in base stations.

It can be appreciated that system architecture 100 is one example system architecture for in-field RF impairment compensation in base stations, and that there can be other system architectures that can facilitate in-field RF impairment compensation in base stations.

FIG. 2 depicts a general learning framework 200 for combining offline and online learning, and that can facilitate in-field RF impairment compensation, in accordance with an embodiment of this disclosure. In some examples, part(s) of FIG. 2 can be used to implement part(s) of FIG. 1 to facilitate in-field RF impairment compensation.

FIG. 2 comprises historically collected data 202 (from field or through emulation), model training 204, offline processing 206, data collection from field or through emulation 208, feature engineering on field data 210 (filtering, interpolation, selection), model inference 212, in-field 214, and device behavior 216.

It can be that, even for in-field learning, feature engineering is still performed on the data that is collected through various in-field telemetry operations from the DUT. In particular the two stages can be generally described as follows:

- Model training (offline) can comprise learning AI/ML model parameters of the signal or process being modeled through often labeled training data followed by validation, and testing. The training process can also be used to generate model performance metrics during the testing phase.
- Model inference can comprise obtaining AI/ML model inference output, such as predictions or decisions, as a function of either the originally trained model or the most recent model version that also incorporates some online feedback based updates. The model inference function can provide model performance feedback to the model training function as well, if applicable.

For facilitating in-field learning, an initial model can be considered to be available, and can have been obtained through a calibration process, or another approach. An inherent challenge with models that are trained offline and then put to work in a time-varying operational environment can be that, over the course of time, the offline-trained models can tend to become sub-optimal (to varying degrees) for the various RF boards. Therefore, techniques for incorporating concept drift tracking can also be employed as new data becomes available. More specifically, with the present techniques, the ML model can be said to suffer from concept drift when the relationship between the features predicted by the deployed model and the target prediction changes due to reasons ranging from software upgrades to variations in the deployed RF environment. Operating with such a model can lead to severely degraded performance compared to the metrics seen with the training and test data sets. In some examples, mitigating concept drift can thus be considered as a part of operationalizing the ML models developed for RF characterization, according to the present techniques. It can be that concept drift cannot be mitigated by simply retraining models frequently using newer data. On the contrary, it can be that doing so can even degrade model accuracy further. While for several parameters involved, network optimization tracking concept drift can be relatively straightforward, whereby one can test the model effectiveness by computing distances between prediction and ground truth, challenges can exist for some cases where ground truth data is not available easily. Since concept drift detection by itself can be quite computationally intensive, the present techniques can be implemented to use detection and mitigation techniques at a central server, such as CU or a RAN intelligent controller (RIC) by collecting statistically significant information from the edge compute resources available in the physical proximity of the RF boards through FL.

FIG. 2 can be used to illustrate an overall in-field learning approach for a full-life cycle in-field model update with distributed learning at each O-RU.

Figure 3:
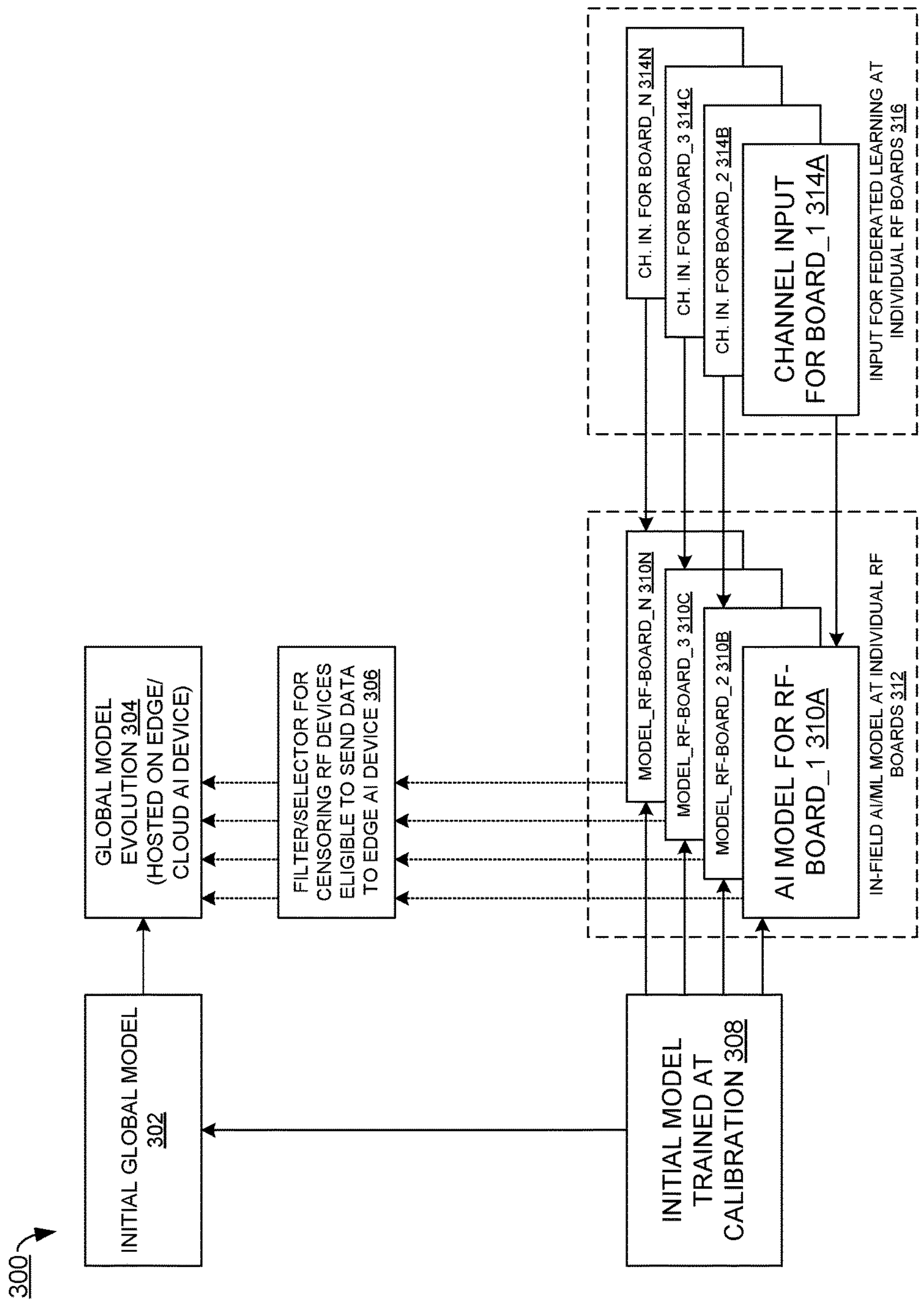
FIG. 3 depicts a framework for In-field learning based on hybrid centralized-distributed learning, and that can facilitate in-field RF impairment compensation, in accordance with an embodiment of this disclosure.

FIG. 3 depicts a framework 300 for in-field learning based on hybrid centralized-distributed learning, and that can facilitate in-field RF impairment compensation, in accordance with an embodiment of this disclosure. In some examples, part(s) of FIG. 3 can be used to implement part(s) of FIG. 1 to facilitate in-field RF impairment compensation.

FIG. 3 comprises initial global model 302, global model evolution 304 (hosted on edge/cloud AI device), filter/selector for censoring RF devices eligible to send data to edge AI device 306, initial model trained at calibration 308, AI model for RF-Board_1 310A, model_RF-Board_2 310B, model_RF-Board_3 310C, model_RF-Board_N 310N, in-field AI/ML model at individual RF boards 312, channel input for board_1 314A, channel input for board_2 314B, channel input for board_3 314C, channel input for board_N 314N (where channel inputs for individual boards can be part of locally-collected data that can be used to update a locally-trained model), and input for federated learning at individual RF boards 316.

FIG. 3 can illustrate at a high level a system according to the present techniques that can facilitate the following for in-field deployment of radio units for cellular networks:

- Considering a use of an initial AI/ML model for pre-compensation of RF impairments, which can be initialized either through offline training of the model, or initiated during initial factory calibration for RF modules considering only at most 'M' RF transceivers where M=1, 2, . . . , K for N total transceivers that are deployed, and K<<N.
- Using hybrid distributed and centralized techniques for in-field model updates to address PVT variations and concept drift through a multi-tier federated learning approach to maintain a current (in time epoch) global model.

Figure 4:
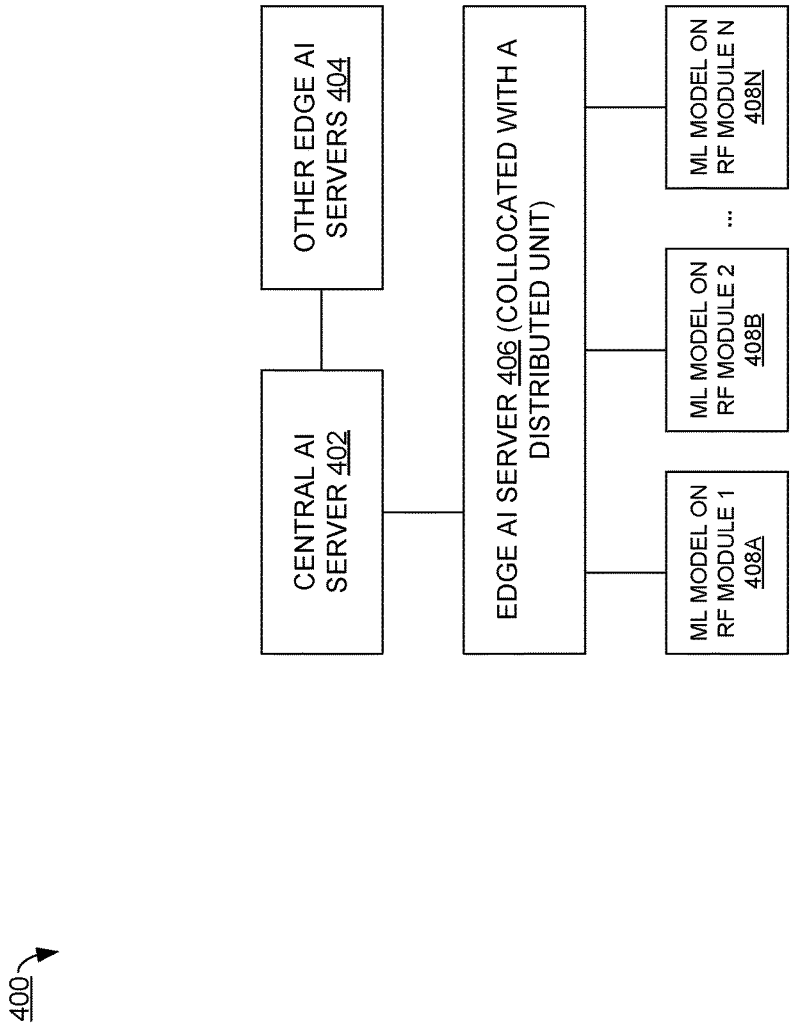
FIG. 4 depicts a multi-tier learning architecture for updating in-field artificial intelligence/machine learning (AI/ML) models for RF impairment compensation, and that can facilitate in-field RF impairment compensation, in accordance with an embodiment of this disclosure.

FIG. 4 depicts a multi-tier learning architecture 400 for updating in-field artificial intelligence/machine learning (AI/ML) models for RF impairment compensation, and that can facilitate that can facilitate in-field RF impairment compensation, in accordance with an embodiment of this disclosure. In some examples, part(s) of FIG. 4 can be used to implement part(s) of FIG. 1 to facilitate in-field RF impairment compensation.

FIG. 4 comprises central AI server 402, other edge AI servers 404, edge AI server 406 (collocated with a distributed unit), ML model on RF module 1 408A, ML model on RF module 2 408B, and ML model on RF module N 408N.

FIG. 4 illustrates a multi-tier learning approach at a high level. FIG. 4 generally illustrates learning and model updates as they happen in terms of (a) local learning at the RU using fairly computationally-inexpensive architectures in order to make sure that the latency sensitive updates are processed within the RU using a combination of deterministic signal processing and shallow machine learning (b) at an edge AI server that is able to aggregate information from the various RUs to provide policy recommendations and model updates that are useful for geographically adjacent radio units such that they are affected by channel behaviors that may have same underlying distribution, but can be distinguished by the hardware process variation specific impairments that are well handled through the step described in (a); and (c) a higher level ML model that can use the filtered RF measurements and model updates from (a) and (b) to update quasi-static parameters of the ML model and also derive longer term policies based on the multi-tier learning model to influence overall network performance considering multiple cell sites in tandem.

Feature engineering of in-field data can be implemented as follows. While new data is measured through the various telemetry points in an RF front-end, and signals collected through the uplink can also provide significant statistical insight into the channel behavior, for an ML model to be updated as per this new data, the data can still need to pre-processed to be useful for updating the ML model. The present techniques can be implemented to use the computational capability that is on-board the radio to do this, and use a global model based processing to determine the kind of feature engineering that can be needed. A quasi-static global model that is periodically updated can help ensure that the criteria for the feature engineering evolves with the model.

Figure 5:
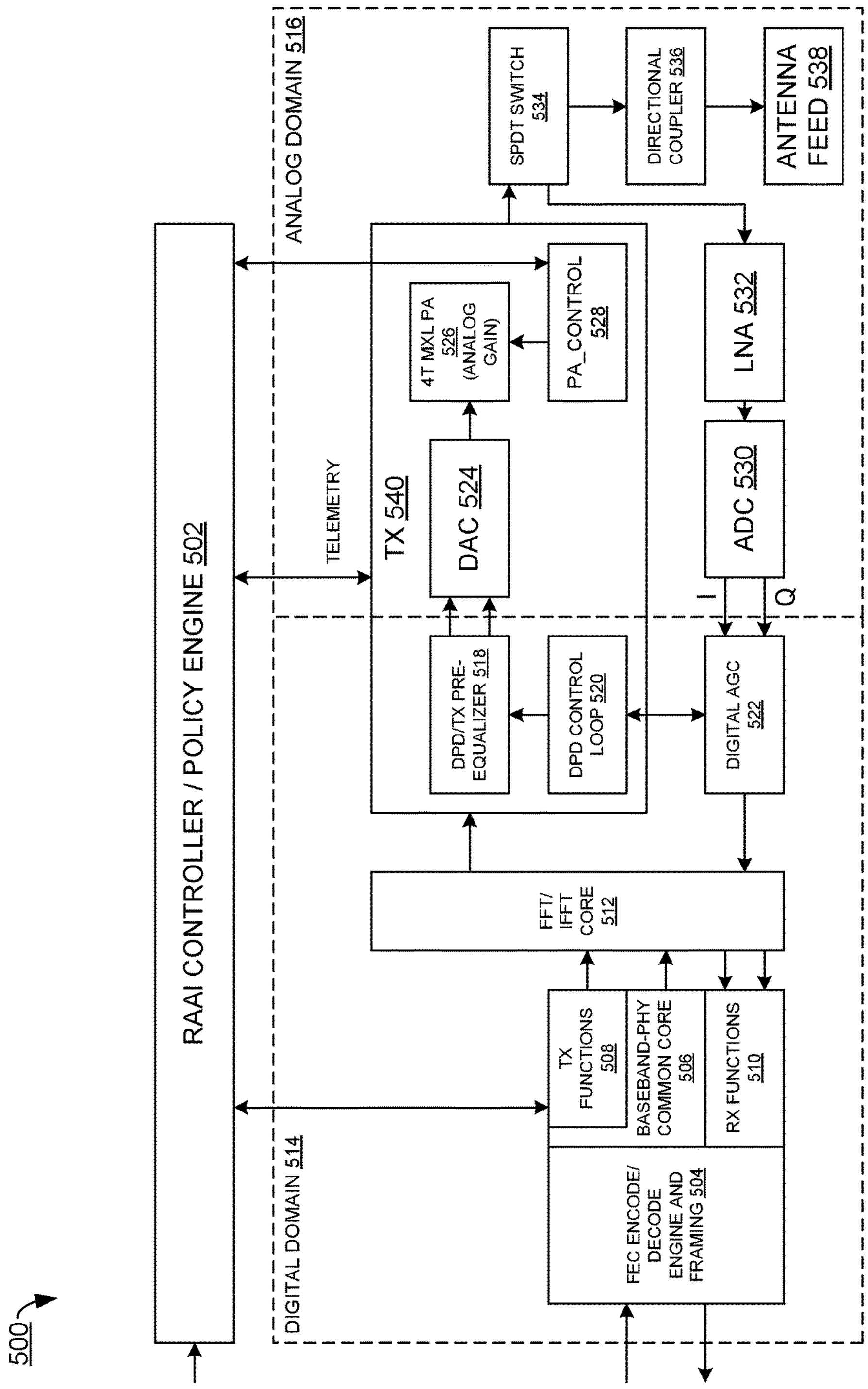
FIG. 5 depicts a block diagram of an open radio unit (O-RU) depicting telemetry points and AI/ML model local learning, and that can facilitate in-field RF impairment compensation, in accordance with an embodiment of this disclosure.

FIG. 5 depicts a block diagram 500 of an open radio unit (O-RU) depicting telemetry points and AI/ML model that can leverage local learning, and that can facilitate in-field RF impairment compensation, in accordance with an embodiment of this disclosure. In some examples, part(s) of FIG. 5 can be used to implement part(s) of FIG. 1 to facilitate in-field RF impairment compensation.

FIG. 5 comprises Radio as an Instrument (RAAI) controller/policy engine 502, forward error correction (FEC) encode/decode engine and framing 504, baseband-physical (PHY) common core 506, transmitter (Tx) functions 508, Fast Fourier transform (FFT)/Inverse Fast Fourier transform (IFFT) core 512, digital domain 514, analog domain 516, digital pre-distortion (DPD)/Tx pre-equalizer 518, DPD control loop 520, digital-audio-converter (DAC) 524, quad-input power amplifier (PA) 526 (analog gain), and PA control 528 within Tx 540 for the transmit path; and digital automatic gain control (AGC) 522, analog-to-digital converter (ADC) 530, low-noise amplifier (LNA) 532, split path double throw (SPDT) switch 534, directional coupler 536, antenna feed 538, and Rx functions 510 in the receive path.

FIG. 5 illustrates an example of the present techniques as applied to blocks in a radio unit, along with some additional blocks that are upstream (physical layer signal processing) and downstream (antenna feed, etc.) from the radio processing unit, as the functional behavior of these blocks can influence how the RF signal is processed. In particular, there can be common baseband-physical core (PHY CORE) modules that have common functionality such as FFT/IFFT processing, transmit and receive signal gain control, and the like, with certain functions that can be specific to downlink and uplink signal processing, respectively. Local learning for the AI/ML models at each RU is controlled by a module referred to as a RAAI controller as shown at the top of FIG. 5.

In FIG. 5, the overall policy engine is fed through various telemetry points. Locally collected RF statistics can be used to update model coefficients only (that is, it can be that no model structural updates are done online). For example, in FIG. 5, the local data can be used to update transmit pre-equalization coefficients, or update the prediction engine for sleep modes.

The local learning can handle aspects such as updating coefficient weight when sudden deviation in signal levels are observed. However, in order to not to not trigger inadvertent changes on a frequent basis, such changes can set the observation interval to be a minimum of S subframes whereby $S>t_{action}$, and $t_{action}$ denotes an amount of time that it takes to initiate model coefficient updates within the local model but $S<t_{Edge}$, whereby $t_{Edge}$ is the sum of the round trip delay to the edge server and model coefficient update through an edge AI server.

Collaborative in-field learning using quantized updates can be implemented as follows. Model training using deep neural network in embedded applications can require high precision (e.g., 32-bit precision). While this can provide for a fairly accurate training based on the collected data set, it can add a heavy computational load that is not amenable for embedded devices that have low computational power, limited power supply, or both. According to the present techniques, quantized N-bit (N<<32) updates can be used for both in-field model update, and update for the global model (such as in FIG. 2). This can allow the application of collaborative learning for diverse RF environments and devices to enhance the performance of a number of RF frontends/devices simultaneously at a lower energy cost. A quantized FL framework can represent data with a finite level of precision in both localized training modules for each radio unit and the corresponding uplink transmission. Finite precision computation using N-bits in the DNN can give rise to a notion of quantized neural networks (QNNs), whereby the weights can also be quantized using M bits, where M<<32 (e.g. 8-12 bits). In a FL model according to the present techniques, each device can train its QNN, and transmit a quantized training result to the global model that is maintained at the near-real-time (RT) or non-RT RIC for processing of longer-term data simultaneously with updates from other qualified radio units.

Qualified radio units can be radio units in a scenario where, for updating the global model through federated learning, not all radio units are either required or allowed to update simultaneously. A qualified radio unit can comprise a radio unit that is permitted to update the global model at a given time. Whether a radio unit is qualified or not can be established the RU itself through a self-censoring metric, that can either be a measure of reliability of the updated set of weights, or using a difference from the previous set of weights that were in use. For the latter, at each of the radio units, a measure of dissimilarity $\theta_{dis}$ can be determined as follows:

$$\theta_{dis} = \left(\sum_{i=1}^{N} \frac{(w_t^i - w_{t-1}^i)}{\|w_{t-1}^i\|}\right) / N \quad (1)$$

A threshold value E can be used on a per radio unit basis to determine if the current weight updates will be transmitted for the global model update. The value of E can be set to be 0.05, for example, to roughly denote a requirement of more than 5% difference in the value of the currently computed weight with respect to the previous set in order to radio to be a qualified unit. In Eq. (1), $$w_t^i$$

denotes the $i^{th}$ computed weight during the $t^{th}$ iteration of the local model update. Note that the time for the in-field model updates can be synchronized through use of a network timing protocol. Additionally, a time-based update can also be triggered in some cases where a certain radio unit has sent no updates from a long duration, denoted by $\theta_{dur}$, which can account for a scenario where each radio unit should be sending an update at least once very $\theta_{dur}$ time units. Although it can be that no explicit relationship needs to exist between $\theta_{dis}$ and $\theta_{dur}$, it can be recommended that 0 dur be sufficiently large such that there are several updates to the global model due to $\theta_{dis}$ to take into account faster variations in the environment, before $\theta_{dur}$ based triggers occur. Where a majority of updates are due to $\theta_{dur}$, then the RF environment can be quasi-static, and it can be that frequent updates are not needed. Therefore, these parameters can be deployment specific and, in some embodiments, also updated through concept drift tracking.

Learning from a small sample set can be implemented as follows. A reason that an application of AI/ML techniques in the RF domain has faced obstacles is that there are several variations in the wireless channel behavior. At the same time, the behavior of the RF frontend modules can be fairly difficult to model accurately using deterministic models owing to aspects like non-linearity, time-variability, and dependence on signal characteristics. These aspects can make the RF domain a prime area where neural network (NN) based models can be used to model a statistical behavior of both the modules as well as the wireless signals. Such learning can sometimes require very large data sets and the higher the dimensional or parametric dependency of the modeled impairment, larger is the required data set. On the other hand, the use of federated learning (FL) for RF tasks that have the same underlying distribution can imply that an intelligent aggregation of the collected raw data sets can lead to substantial improvement of the overall model performance.

The following are examples of how the present techniques can be used for various stages of learning for use of AI/ML model for RF processing from initialization all the way to in-field learning.

Figure 6:
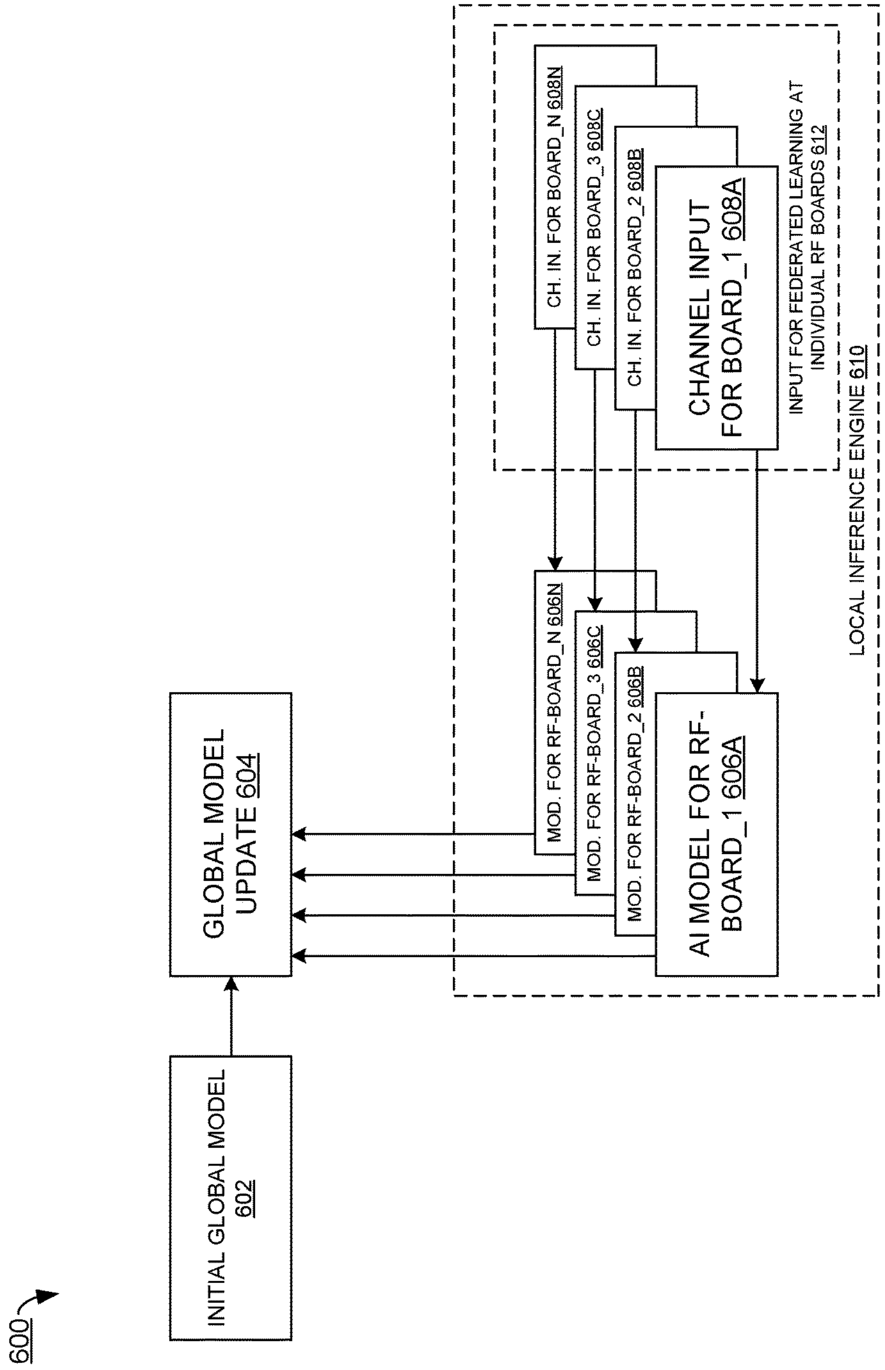
FIG. 6 depicts federated learning of RF characteristics for in-field updates, and that can facilitate in-field RF impairment compensation, in accordance with an embodiment of this disclosure.

FIG. 6 depicts federated learning 600 of RF characteristics for in-field updates, and that can facilitate in-field RF impairment compensation, in accordance with an embodiment of this disclosure. In some examples, part(s) of FIG. 6 can be used to implement part(s) of FIG. 1 to facilitate in-field RF impairment compensation.

FIG. 6 comprises initial global model 602, global model update 604, AI model for RF-Board_1 606A, model for RF-Board_2 606B, model for RF-Board_3 606C, model for RF-Board_N 606N, channel input for Board_1 608A, channel input for Board_2 608B, channel input for Board_3 608C, channel input for Board_N 608N, local inference engine 610, and input for federated learning at individual RF boards 612.

A field update through federated/distributed learning can be implemented as follows. While initialization through various means can help with a sub-optimal initialization of the AI/ML model, to run a network at full efficiency, federated learning at individual RUs when operational can be implemented.

Here the federated learning aspect can be implemented using different variations as described below. A basic premise of application can be captured by noting that, since an initial global model already exists, it can be that the local RUs only need to send information related to the model parameter update.

Moreover, in some examples, a full model update can also be initiated, but at a much slower time scale (e.g. once a month). Using this approach can avoid a reliance on ultra-high end-to-end reliability and very low round-trip latency for uploading the data and pertinent measurement and downloading control commands that can be required for doing a full inference on edge.

In some examples, there can be variations of embodiments considering a combination of phases. Different embodiments can be implemented, such that one or more procedural updates are omitted, and the learning approaches can still apply independently. An embodiment may be considered such that model transfer using domain adaptation only is performed, and no global model updates are made. An embodiment can consider model initialization through transfer learning from a single transceiver, followed by global model updates only from a partial (fixed) set of RUs, periodically, so as to reduce a cost of communication for federated learning.

Example Process Flows

FIG. 7 illustrates an example process flow 700 that can facilitate in-field RF impairment compensation in base stations, in accordance with an embodiment of this disclosure. In some examples, one or more embodiments of process flow 700 can be implemented by in-field RF impairment compensation component 108 of FIG. 1, or computing and communications environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, and/or process flow 900 of FIG. 9.

Process flow 700 begins with 702, and moves to operation 704.

Operation 704 depicts receiving a global machine learning model. Using the example of FIG. 3, this local machine learning model can be AI model for RF-Board_1 310A, received as part of initial model trained at calibration 308. That is, there can be a factory calibration step that occurs offline, and prior to deployment of a radio card in-field. In other examples, this global machine learning model can be initially received from global model evolution 304.

After operation 704, process flow 700 moves to operation 706.

Operation 706 depicts training the global machine learning model with local radio frequency data to produce a trained local model, where the trained local model is trained to provide self-calibration information for calibration of the system or RF impairment compensation in at least one of transmitting or receiving radio frequency data. Using the example of FIG. 4, this can comprise ML model on RF module 1 408A being trained locally on a RU that hosts it, using local data. In some examples, a trained model can take RF data as input, and output calibration information for self-calibrating the RU on which the model executes.

After operation 706, process flow 700 moves to operation 708.

Operation 708 depicts receiving a first global model update from an edge server that is configured to communicate with a group of radio frequency devices. Using the example of FIG. 4, this can comprise edge AI server 406 sending a global model update to RF module 1 408A. Edge AI server 406 can train the global model for the global model update based on federated learning performed by multiple RF modules with which the edge AI server is in communication, where the RF modules send updated weights for the model to the edge AI server, and the edge AI server aggregates these updated weights in a global model update (which can also comprise updated weights for a model). In some examples, edge AI server 406 can train the global model for the global model update based on aggregated data received from multiple RF modules with which the edge AI server is in communication, and the edge AI server uses this aggregated data to train the global model to produce the global model update.

In some examples, a global model update can comprise changes to a model, or a full model. Security can be facilitated by a RF module anonymizing data that it sends to the edge AI server.

In some examples, operation 708 comprises performing third federated learning of the local machine learning model to produce federated update information, and sending the federated update information to the edge server for the edge server to generate the first global model update based on the federated update information. That is, an edge serve can aggregate information from multiple RUs that are connected to the edge server, and use this information to produce the first global model update.

In some examples, operation 708 comprises sending federated learning data to the edge server based on the system being a qualified device with respect to the first federated learning to produce the first global model update, where at least one radio frequency device of the group of radio frequency devices comprises an unqualified device that is disregarded with respect to the first federated learning. That is, censoring of RUs can be performed so that not all RUs provide data that is used in creating a particular global model update. In some examples, this censoring can be performed at the edge server, or at a component that sits between the edge server and the RUs.

In some examples, self-censoring can be performed by each RU, where a RU is aware of the censoring criterion.

A similar approach to censoring can be taken with respect to federated learning at a central server.

In some examples, the system is the qualified device based on first values of first respective weights corresponding to the federated learning data being determined to be within a defined difference criterion of second values of second respective weights of prior federated learning data. That is, data from an RU can be censored where it is sufficiently different from previous data that was generated as part of federated learning.

In some examples, the defined difference criterion is a first defined difference criterion, and a radio frequency device of the group of radio frequency devices applies a second defined difference criterion that differs from the first defined difference criterion. That, is the defined difference criterion can be implemented at a per-RU level, and its value can differ between different RUs.

After operation 708, process flow 700 moves to operation 710.

Operation 710 depicts updating the trained local model based on the first global model update to produce a first updated local model. In some examples, this can comprise updating weights of the trained local model, and/or a structure of the trained local model (e.g., nodes, edges, and/or layers of the trained local model).

Updating a trained local model with a global model can comprise updating part of the local model. For example, the global model update can be used to update a part of a local model used to determine an optimal amplifier bias level, where a part of a local model used to determine pre-distortion coefficients that are used for a certain PA bias level is not affected by the global model update.

After operation 710, process flow 700 moves to operation 712.

Operation 712 depicts receiving a second global model update from a central server that is configured to communicate with a group of edge servers that includes the edge server, where the second global model update is based on second federated learning of the group of edge servers. Using the example of FIG. 4, this can be a global model update from central AI server 402.

In some examples, operation 712 comprises performing third federated learning of the local machine learning model to produce federated update information, and sending the federated update information to the central server for the central server to generate the second global model update based on the federated update information.

Sending the federated update information to the central server can comprise sending data iteratively to the central server, where each data set is different.

It can be that a statistical distribution of data collected at each RU can be different from that collected at other RUs. Where data has a low reliability, censoring of the data can be performed, as described herein. Censoring can also be implemented so as not to overburden the central server with a deluge of data for each global update, where it can be that not all RUs participate during a global model update. In some examples, a subset of RUs can be selected via a scheduling mechanism, or the central server can act as an arbiter based on the traffic experienced at each RU.

In some examples, a two-tiered version of the present techniques can be implemented that omits a central server, or RUs do not send radio measurements/data to the central server, but rather send an aggregated statistic that gleans a requisite intelligence input from radio measurements is sent to a central server. Sending an aggregated statistic can lead to reducing an amount of bandwidth used to transfer information to the central server, where it is implemented instead of sending data in its raw form.

In some examples, iterations of receiving first updated versions of the first global model update occur according to a first time period, iterations of receiving second updated versions of the second global model update occur according to a second time period, and the first time period is shorter than the second time period. That is, an edge server can send global updates to RF devices more frequently than a central server sends global updates to those RF devices.

After operation 712, process flow 700 moves to operation 714.

Operation 714 depicts updating the first updated local model based on the second global model update to produce a second updated local model. This can be performed in a similar manner as operation 710, as applied to the second global model update compared to the first global model update in operation 710.

After operation 714, process flow 700 moves to operation 716.

Operation 716 depicts performing self-calibration based on the second updated local model to produce a configuration. This self-calibration (where performed by a RU, indicating that the RU can calibrate itself) can comprise calibrating aspects such as a bias level, pre-distortion coefficients that are used for a certain PA bias level, transmit output power, energy efficiency, skew, FO mitigation, etc.

After operation 716, process flow 700 moves to operation 718.

Operation 718 depicts at least one of transmitting or receiving the radio frequency data based on the configuration. That is, after performing self-calibration, the system can then send and/or receive RF data in its newly self-calibrated state.

After operation 718, process flow 700 moves to 720, where process flow 700 ends.

FIG. 8 illustrates an example process flow 800 that can facilitate in-field RF impairment compensation in base stations, in accordance with an embodiment of this disclosure. In some examples, one or more embodiments of process flow 800 can be implemented by in-field RF impairment compensation component 108 of FIG. 1, or computing and communications environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, and/or process flow 900 of FIG. 9.

Process flow 800 begins with 802, and moves to operation 804.

Operation 804 depicts updating a trained local model to produce an updated local model, where the trained local model was generated as a result of training a local machine learning model with local radio frequency data, where the trained local model is configured to provide self-calibration information for calibration of the system, and where the updating is based on: receiving a first global model update from an edge server that is configured to communicate with a group of radio frequency devices that perform first federated learning for the first global model update, and receiving a second global model update from a central server that is configured to communicate with a group of edge servers that includes the edge server, where the group of edge servers perform second federated learning for the second global model update. In some examples, operation 804 can be implemented in a similar manner as operations 706-714 of FIG. 7.

In some examples, updating a local model can be performed locally, through local learning, to update coefficient values (e.g., for compensation aspects that are desired to operate at baud rate).

In some examples, the edge server comprises a distributed unit, and where respective radio frequency devices of the group of radio frequency devices comprise respective radio units. That is, an edge server can comprise a DU, and it can update the global model based on FL information received from the RUs that the DU communicates with.

In some examples, operation 804 comprises receiving a global machine learning model before training it locally to form a local machine learning model, where the local machine learning model could be generated at a radio frequency device that is separate from the group of radio frequency devices. In some examples, this can be performed in a similar manner as operation 704 of FIG. 7.

In some examples, the local radio frequency data comprises live field data. In some examples, the local radio frequency data comprises emulated data.

In some examples, operation 804 comprises receiving an indication from the edge server or the central server relating to performance of at least one of filtering, interpolation, or selection on the locally obtained data. That is, global model-based processing can be performed to determine the kind of feature engineering to use. A quasi-static global model that is periodically updated can help ensure that the criteria for the feature engineering also evolves with the model.

In some examples, operation 804 comprises receiving an indication from the edge server or the central server relating to performance of at least one of the filtering, the interpolation, or the selection. That is, global model-based processing can be performed to determine the kind of feature engineering to use. A quasi-static global model that is periodically updated can help ensure that the criteria for the feature engineering also evolves with the model.

After operation 804, process flow 800 moves to operation 806.

Operation 806 depicts performing self-calibration based on the updated local model. In some examples, operation 806 can be implemented in a similar manner as operation 716 of FIG. 7.

After operation 806, process flow 800 moves to 808, where process flow 800 ends.

FIG. 9 illustrates an example process flow 900 that can facilitate in-field RF impairment compensation in base stations, in accordance with an embodiment of this disclosure. In some examples, one or more embodiments of process flow 900 can be implemented by in-field RF impairment compensation component 108 of FIG. 1, or computing and communications environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, and/or process flow 800 of FIG. 8.

Process flow 900 begins with 902, and moves to operation 904.

Operation 904 depicts training a local model, where the local model is configured to generate radio frequency calibration information. In some examples, operation 904 can be implemented in a similar manner as operation 706 of FIG. 7.

After operation 904, process flow 900 moves to operation 906.

Operation 906 depicts updating the local model to produce an updated local model, the updating being based on: receiving a first global model update from a first computer that is configured to communicate with a group of radio frequency devices that perform first federated learning for the first global model update, and receiving a second global model update from a second computer that is configured to communicate with a group of first computers that includes the first computer, where the group of first computers perform second federated learning for the second global model update. In some examples, operation 906 can be implemented in a similar manner as operations 708-714 of FIG. 7.

In some examples, the first global model update comprises a quantized model comprises a first bit resolution for the data that is transferred through the links for the global model update that is smaller than a second bit resolution of the local model that is used for the model coefficients/weights.

In some examples, a first hardware type of the system differs from a second hardware type of a radio frequency device of the group of radio frequency devices.

In some examples, the radio frequency calibration information comprises pre-equalization coefficients, or calibration information for sleep modes of the system. That is, in some examples, local data can be used to update transmit pre-equalization coefficients or the prediction engine for sleep modes.

In some examples, the updated local model is a first updated local model, the second global model update comprises updates to coefficients of the first updated local model while holding a structure of the updated local model constant, operation 906 comprises receiving a third global model update from the second computer, where the third global model update affects the structure of the first updated local model, and updating the first updated local model based on the third global model update to produce a second updated local model.

In some examples, iterations of receiving first updated versions of second global model update occur according to a first time period, where iterations of receiving second updated versions of the third global model update occur according to a second time period, and where the first time period is shorter than the second time period. That is, there can be a full update to a local model (e.g., updating a number and arrangement of neurons, connections, and/or layers) that can be initiated at a slower time scale than an update of a model's weights.

After operation 906, process flow 900 moves to operation 908.

Operation 908 depicts performing self-calibration based on the updated local model. In some examples, operation 908 can be implemented in a similar manner as operation 716 of FIG. 7.

After operation 908, process flow 900 moves to 910, where process flow 900 ends.

Example Operating Environment

Figure 10:
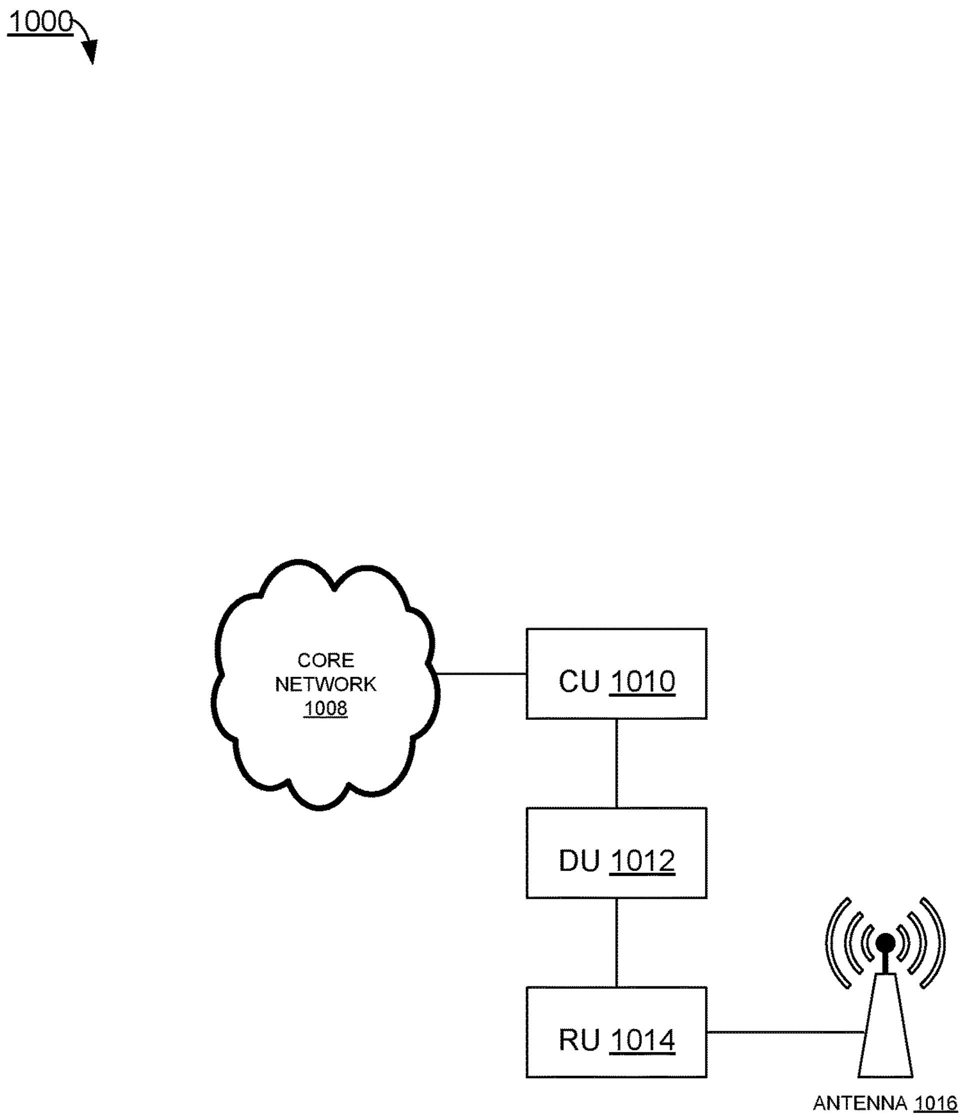
FIG. 10 illustrates an example block diagram of a computing and communications environment operable to execute an embodiment of this disclosure.

In order to provide additional context for various embodiments described herein, FIG. 10 and the following discussion are intended to provide a brief, general description of a suitable computing and communications environment 1000 in which the various embodiments of the embodiment described herein can be implemented.

In some examples, computing and communications environment 1000 can implement one or more embodiments of the process flows of FIGS. 7-9 to facilitate in-field RF impairment compensation in base stations.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

FIG. 10 illustrates an example block diagram 1000 of components operable to execute an embodiment of this disclosure.

Core network 1008 can comprise components of a third generation (3G), fourth generation (4G), long term evolution (LTE), 5G, or other, wireless communication network. Core network 1008 can be configured to establish connectivity between a UE and a communications network (such as the Internet), such as through facilitating services such as connectivity and mobility management, authentication and authorization, subscriber data management, and policy management. Messages sent between a UE and a communications network can propagate through CU 1010, DU 1012, RU 1014, and antenna 1016.

CU 1010 can be configured to process non-real-time radio resource control (RRC) and packet data convergence protocol (PDCP) communications. DU 1012 can be configured to process communications transmitted according to radio link control (RLC), medium access control (MAC), and PHY layers. RU 1014 can be configured to convert radio signals sent to antenna 1016 from digital packets to radio signals, and convert radio signals received from antenna 1016 from radio signals to digital packets. Antenna 1016 (which can comprise a transceiver) can be configured to send and receive radio waves that are used to convey information.

CONCLUSION

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, optical disk storage, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:

receiving, by a radio frequency device of a system comprising at least one processor, a global machine learning model;

training, by the system, the global machine learning model with local radio frequency data to produce a trained local machine learning model, wherein the trained local model is trained to provide self-calibration information for calibration and impairment compensation of the system in at least one of transmitting or receiving radio frequency data;

receiving, by the system, a first global model update from an edge server that is configured to communicate with a group of radio frequency devices;

updating, by the system, the trained local machine learning model based on the first global model update to produce a first updated local machine learning model;

receiving, by the system, a second global model update from a central server that is configured to communicate with a group of edge servers that includes the edge server, wherein the second global model update is based on second federated learning of the group of edge servers;

updating the first updated local machine learning model based on the second global model update to produce a second updated local machine learning model;

performing, by the system, self-calibration and impairment compensation based on the second updated local machine learning model to produce a compensated signal using the updated local machine learning model; and at least one of transmitting or receiving, by the system, the radio frequency data based on the compensated signal.

2. The method of claim 1, further comprising:

performing, by the system, third federated learning of the local machine learning model to produce federated update information; and sending, by the system, the federated update information to the edge server for the edge server to generate the first global model update based on the federated update information.

3. The method of claim 1, further comprising:

performing, by the system, third federated learning of the local machine learning model to produce federated update information; and sending, by the system, the federated update information to the central server for the central server to generate the second global model update based on the federated update information.

4. The method of claim 1, further comprising:

sending, by the system, federated learning data to the edge server based on the system being a qualified device with respect to the first federated learning to produce the first global model update, wherein at least one radio frequency device of the group of radio frequency devices comprises an unqualified device that is disregarded with respect to the first federated learning.

5. The method of claim 4, wherein the system is the qualified device based on first values of first respective weights corresponding to the federated learning data being determined to be within a defined difference criterion of second values of second respective weights of prior federated learning data.

6. The method of claim 5, wherein the defined difference criterion is a first defined difference criterion, and wherein a radio frequency device of the group of radio frequency devices applies a second defined difference criterion that differs from the first defined difference criterion.

7. The method of claim 1, wherein iterations of receiving first updated versions of the first global model update occur according to a first time period, wherein iterations of receiving second updated versions of the second global model update occur according to a second time period, and wherein the first time period is shorter than the second time period.

8. A system, comprising:

at least one processor; and at least one memory coupled to the at least one processor, comprising instructions that, in response to execution by the processor, cause the system to perform operations, comprising:

updating a trained local model to produce an updated local model, wherein the trained local model was generated as a result of training a local machine learning model with local radio frequency data or measurements, wherein the trained local model is configured to provide self-calibration information for calibration of the system, and wherein the updating is based on:

receiving a first global model update from an edge server that is configured to communicate with a group of radio frequency devices that perform first federated learning for the first global model update, and receiving a second global model update from a central server that is configured to communicate with a group of edge servers that includes the edge server, wherein the group of edge servers perform second federated learning for the second global model update; and performing self-calibration based on the updated local model.

9. The system of claim 8, wherein the edge server comprises a distributed unit, and wherein respective radio frequency devices of the group of radio frequency devices comprise respective radio units.

10. The system of claim 8, wherein the operations further comprise:

receiving the local machine learning model before training the local machine learning model, wherein the local machine learning model was generated at a radio frequency device that is separate from the group of radio frequency devices.

11. The system of claim 8, wherein the local radio frequency data comprises live field data.

12. The system of claim 8, wherein the local radio frequency data comprises emulated data.

13. The system of claim 8, wherein the local radio frequency data comprises live field data, and wherein the local machine learning model being trained with the local radio frequency data to produce the trained local model comprises:

at least one of filtering, interpolation, or selection being performed on the live field data to produce feature-engineered data; and the local machine learning model being trained with the feature-engineered data.

14. The system of claim 13, wherein the operations further comprise:

receiving an indication from the edge server or the central server relating to performance of at least one of the filtering, the interpolation, or the selection.

15. A non-transitory computer-readable medium comprising instructions that, in response to execution, cause a system comprising at least one processor to perform operations, comprising:

training a local model, wherein the local model is configured to generate radio frequency calibration information;

updating the local model to produce an updated local model, the updating being based on:

receiving a first global model update from a first computer that is configured to communicate with a group of radio frequency devices that perform first federated learning for the first global model update, and receiving a second global model update from a second computer that is configured to communicate with a group of first computers that includes the first computer, wherein the group of first computers perform second federated learning for the second global model update; and performing self-calibration based on the updated local model.

16. The non-transitory computer-readable medium of claim 15, wherein the first global model update comprises a quantized model comprises a first bit resolution that is smaller than a second bit resolution of the local model.

17. The non-transitory computer-readable medium of claim 15, wherein a first hardware type of the system differs from a second hardware type of a radio frequency device of the group of radio frequency devices.

18. The non-transitory computer-readable medium of claim 15, wherein the radio frequency calibration information comprises pre-equalization coefficients, or calibration information for sleep modes of the system.

19. The non-transitory computer-readable medium of claim 15, wherein the updated local model is a first updated local model, wherein the second global model update comprises updates to coefficients of the first updated local model while holding a structure of the updated local model constant, and wherein the operations further comprise:

receiving a third global model update from the second computer, wherein the third global model update affects the structure of the first updated local model; and updating the first updated local model based on the third global model update to produce a second updated local model.

20. The non-transitory computer-readable medium of claim 19, wherein iterations of receiving first updated versions of second global model update occur according to a first time period, wherein iterations of receiving second updated versions of the third global model update occur according to a second time period, and wherein the first time period is shorter than the second time period.

* * * * *